United States Patent
Nakano et al.

(10) Patent No.: US 11,586,851 B2
(45) Date of Patent: Feb. 21, 2023

(54) IMAGE CLASSIFICATION USING A MASK IMAGE AND NEURAL NETWORKS

(71) Applicant: International Business Machines Corporation, Armonk, NY (US)

(72) Inventors: Hiroki Nakano, Otsu (JP); Takuya Goto, Tokyo (JP); Masaharu Sakamoto, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 17/149,078

(22) Filed: Jan. 14, 2021

(65) Prior Publication Data

US 2021/0142119 A1 May 13, 2021

Related U.S. Application Data (63) Continuation of application No. 16/177,886, filed on Nov. 1, 2018, now Pat. No. 10,936,912.

(51) Int. Cl.
*G06K 9/62* (2022.01)

(52) U.S. Cl.
CPC ......... *G06K 9/6262* (2013.01); *G06K 9/6256* (2013.01)

(58) Field of Classification Search
CPC ............. G06T 7/00; G06T 2207/20081; G06T 2207/20084
See application file for complete search history.

(56) References Cited

U.S. PATENT DOCUMENTS

| 6,549,646 | B1 | 4/2003 | Yeh et al. |
| 2009/0252395 | A1 | 10/2009 | Chan et al. |
| 2017/0270374 | A1 | 9/2017 | Myers et al. |
| 2018/0144249 | A1 | 5/2018 | Nagato et al. |
| 2019/0347526 | A1 | 11/2019 | Sunkavalli et al. |
| 2020/0034971 | A1 | 1/2020 | Xu et al. |
| 2020/0143204 | A1 | 5/2020 | Nakano et al. |

FOREIGN PATENT DOCUMENTS

| CN | 105574871 A | 5/2016 |
| CN | 105640577 A | 6/2016 |
| JP | 04264985 A | 9/1992 |
| JP | 06266405 A | 9/1994 |
| JP | 10232938 A | 9/1998 |
| JP | 2001034758 A | 2/2001 |
| JP | 2002123834 A | 4/2002 |

(Continued)

OTHER PUBLICATIONS

Camlica, et al., "Medical Image Classification via SVM using LBP Features from Saliency-Based Folded Data", Proceedings of The 14th International Conference on Machine Learning and Applications (IEEE ICMLA'15), Miami, Florida, USA, 2015, pp. 1-5, <https://arxiv.org/pdf/1509.04619.pdf>.

(Continued)

*Primary Examiner* — Sam Bhattacharya (57) ABSTRACT

Image classification using a generated mask image is performed by generating a mask image that extracts a target area from an input image, extracting an image feature map of the input image by inputting the input image in a first neural network including at least one image feature extracting layer, masking the image feature map by using the mask image, and classifying the input image by inputting the masked image feature map to a second neural network including at least one classification layer.

21 Claims, 8 Drawing Sheets

(56) References Cited

FOREIGN PATENT DOCUMENTS

| | | |
|---|---|---|
| JP | 2005266014 A | 9/2005 |
| JP | 2005529548 A | 9/2005 |
| JP | 2010058903 A | 3/2010 |
| JP | 2013081136 A | 5/2013 |
| JP | 2017211497 A | 11/2017 |
| JP | 2018018350 A | 2/2018 |
| WO | 2017171005 A1 | 10/2017 |

OTHER PUBLICATIONS

Kumar, et al., "Detection system for lung cancer based on neural network: X-Ray validation performance". International Journal of Enhanced Research in Management & Computer Applications, ISSN: 2319-7471, vol. 2 Issue 9, Nov.-Dec., 2013, pp. 40-47.

Li, et al., "A Visual Saliency-Based Method for Automatic Lung Regions Extraction in Chest Radiographs", 2017 14th International Computer Conference on Wavelet Active Media Technology and Information Processing (ICCWAMTIP), pp. 162-165.

Pesce, et al., "Learning to detect chest radiographs containing lung nodules using visual attention networks", arXiv:1712.00996v2 [stat. ML], May 17, 2018, pp. 1-23, <https://arxiv.org/pdf/1712.00996.pdf>.

Ronneberger, et al., "U-Net: Convolutional Networks for Biomedical Image Segmentation", arXiv:1505.04597v1 [cs.CV] May 18, 2015, pp. 1-8.

Selvaraju, et al., "Grad-cam: Visual Explanations from Deep Networks via Gradient-based Localization", 2017 IEEE International Conference on Computer Vision (ICCV), pp. 618-626.

List of IBM Patents or Patent Applications Treated as Related, Jan. 13, 2021, 2 pgs.

IMAGE CLASSIFICATION USING A MASK IMAGE AND NEURAL NETWORKS

BACKGROUND

The present disclosure relates to classifying an input image by using a mask image. More specifically, the present disclosure relates to classifying an input image by using a mask image generated from the input image.

Recently, using a multi-layer neural network has become popular for classifying or identifying an input image. For example, in the medical field, use of multi-layer neural networks has gradually increased for detecting pneumonias or lung nodules from X-ray images of lungs.

However, current neural networks only output a result (e.g., probability or degree of certainty) of detecting a target object within the input image as a whole. Current neural networks do not output the area in the input image where the target object is found. In pneumonia or lung-nodule detection, such neural networks only output a probability or a certainty of the presence of disease in the X-ray image of lungs as a whole. Therefore, users (e.g., doctors or other medical professionals) cannot make sure that the illness is detected in the actual lung area of the input image.

SUMMARY

According to some embodiments of the present disclosure, provided is a computer-implemented method comprising generating a mask image that extracts a target area from an input image, extracting an image feature map of the input image by inputting the input image in a first neural network including at least one image feature extracting layer, masking the image feature map by using the mask image, and classifying the input image by inputting the masked image feature map to a second neural network including at least one classification layer. In this way, the input image can be classified based on information within the target area extracted by the mask image.

The generating the mask image may include generating the mask image by using a third neural network. Therefore, it is possible to generate the mask image without implementing a specific image processing algorithm.

The computer-implemented method may further comprise receiving a training input image and a training mask image, and training the third neural network based on the training input image and the training mask image. In this way, the third neural network can be trained separately from training the first and second neural networks.

The computer-implemented method may further comprise receiving a training input image and a training classification, generating a training mask image that extracts a target area from the training input image, and training the first neural network and the second neural network based on the training input image, the training classification, and the training mask image. In this way, the first and second neural networks can be trained by using the training mask image generated from the training input image, and therefore the first neural network can be trained within the portion relating to the target area extracted by the training mask image.

The computer-implemented method may further comprise generating a saliency map that shows an area of the input image that affected the classification of the input image. In this way, the saliency map can show an area affected to the classification only or mostly in the target area in the image.

The input image may be an X-ray image of an organ, and the generating the mask image may include extracting an image area corresponding to the organ from the input image. In this way, it is possible to detect a disease relating to the organ of interest.

According to other embodiments of the present disclosure, provided is a computer program product for image classification, the computer program product comprising a computer readable storage medium having program instructions embodied therewith, the program instructions executable by a processor to cause the processor to perform operations comprising generating a mask image that extracts a target area from an input image, extracting an image feature map of the input image by inputting the input image in a first neural network including at least one image feature extracting layer, masking the image feature map by using the mask image, and classifying the input image by inputting the masked image feature map to a second neural network including at least one classification layer.

According to other embodiments of the present disclosure, provided is an apparatus comprising one or more processors, and a memory communicatively coupled to the one or more processors, wherein the memory comprises instructions that, when executed by the one or more processors, cause the one or more processors to generate a mask image that extracts a target area from an input image, extract an image feature map of the input image by inputting the input image in a first neural network including at least one image feature extracting layer, mask the image feature map by using the mask image; and classify the input image by inputting the masked image feature map to a second neural network including at least one classification layer.

According to other embodiments of the present disclosure, provided is an apparatus comprising a mask generator configured to generate a mask image that extracts a target area from an input image, a first neural network configured to receive the input image and output an image feature map of the input image, wherein the first neural network includes at least one image feature extracting layer, a masking section configured to mask the image feature map by using the mask image, and a second neural network configured to receive the masked image feature map and output a classification of the input image, wherein the second neural network includes at least one classification layer.

The summary clause does not necessarily describe all necessary features of the embodiments of the present disclosure. Embodiments of the present disclosure may also be a sub-combination of the features described above.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Hereinafter, example embodiments of the present disclosure will be described. The example embodiments shall not limit the disclosure, and the combinations of the features described in the embodiments are not necessarily essential to the disclosure.

Figure 1:
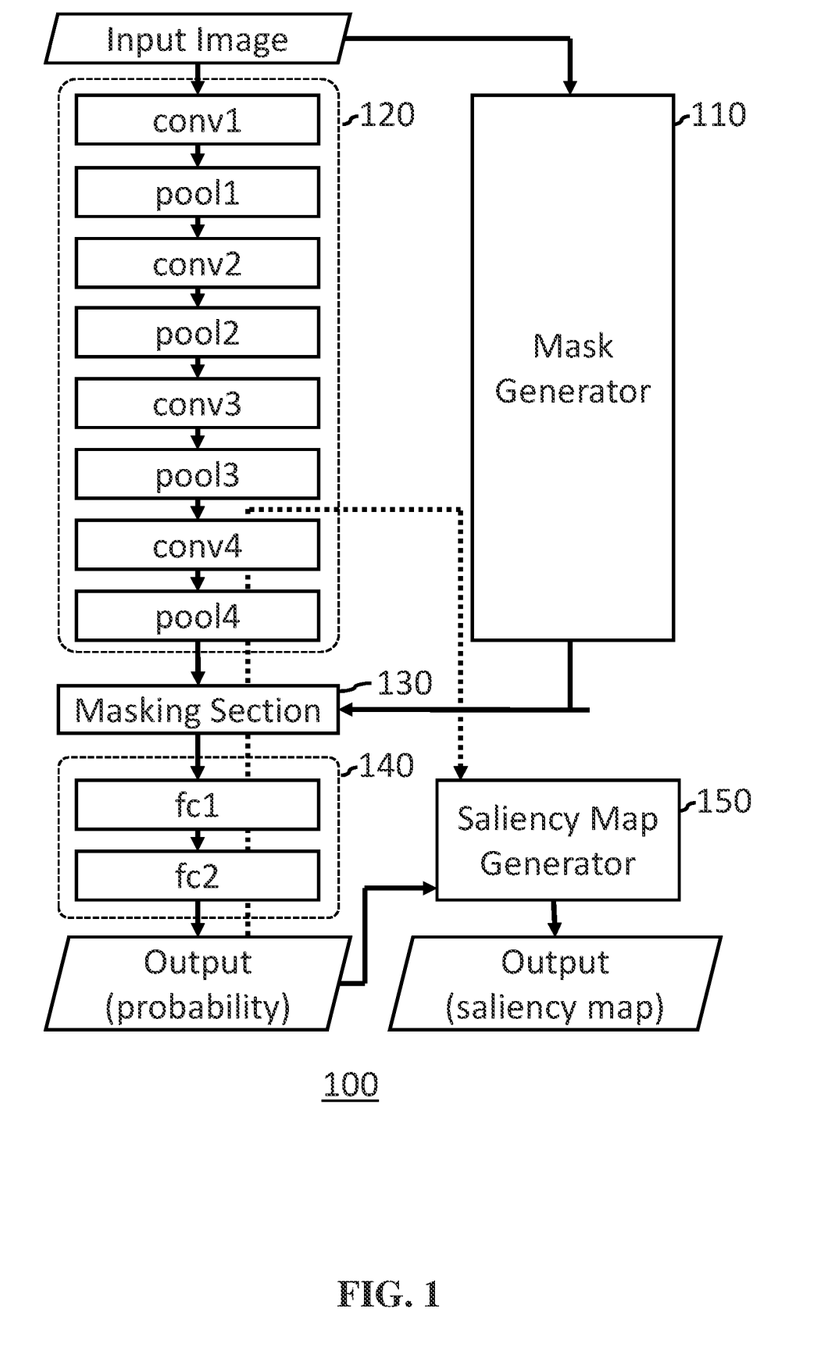
FIG. 1 shows an apparatus according to some embodiments of the present disclosure.

FIG. 1 shows an apparatus 100 according to some embodiments of the present disclosure. Apparatus 100 receives an input image and generates an output that, as an example, represents a probability that the input image can be categorized in a predetermined class. Apparatus 100 may receive an X-ray image of an organ. In some embodiments, apparatus 100 can receive an X-ray image of a chest and can output a probability of a presence of disease(s) in the lung area. In other embodiments, apparatus 100 can be used for categorizing input images in other types of classes (e.g., detecting a defect of products).

Apparatus 100 includes mask generator 110, first neural network section 120, masking section 130, and second neural network section 140. Mask generator 110 receives an input image and generates a mask image that extracts a target area from an input image. Mask generator 110 may extract an image area corresponding to the organ from the input image. In this embodiment, mask generator 110 extracts an image area corresponding to lungs in the input image.

In some implementations, one or more of the images (e.g., the input image and the mask image) are two-dimensional images, which are two-dimensional arrays of pixels (x, y) (x=0, 1, . . . , $SIZE_x-1$, where SIZER corresponds to the size of the image in pixels along the x axis and y=0, 1, . . . , $SIZE_y-1$, where $SIZE_y$ corresponds to the size of the image in pixels along the y axis). In other implementations, images can be three-dimensional images. The mask image is an image that distinguishes the target area of the input image from irrelevant areas of the input image. In this embodiment, the mask image has pixels each having a pixel value based on an estimated probability (which can be represented e.g., by 0.8 if the probability is 80%) that the pixel is in the target area (e.g., lung area). In another embodiment, the mask image has pixels in the target area having maximum pixel value (e.g., 1, $2^8-1$, $2^{16}-1$, or 1.0) and pixels out of the target area having minimum pixel value (e.g., 0 or 0.0).

First neural network section 120 receives the input image, extracts an image feature map of the input image, and outputs the image feature map of the input image. First neural network section 120 is a first neural network including at least one image feature extracting layer. The image feature map can be an array of features (x, y) (e.g., x=0, 1, . . . , SIZE-1, where $SIZE_x$ corresponds to the size of the image in pixels along the x axis, and y=0, 1, . . . , $SIZE_y-1$, where $SIZE_y$ corresponds to the size of the image in pixels along the y axis), and each feature can represent characteristics of a corresponding area or sub-image of the input image. An image feature extracting layer receives the input image, or in embodiments with more than one image feature extracting layer, an input image feature map having an array structure (two-dimensional array structure in this embodiment) from the preceding layer, generates an output image feature map having an array structure based on the input image or the input image feature map from the preceding layer, and outputs the generated output image feature map to a succeeding layer. The at least one image feature extracting layer may include at least one of a convolution layer or a max pooling layer. The at least one image feature extracting layer may also include any other neural network layer (e.g., up-sampling layer, down-sampling layer, and concatenation layer) that outputs an array of features (x, y).

In embodiments with one or more convolution layers, the convolution layer(s) can generate the output image feature map by applying a convolution operation to the input image or the input image feature map. The convolution layer(s) can calculate each feature (x', y') in the output image feature map based on a sub-image or an area having a size of Nx*Ny (e.g., 2×2, 4×4 and so on) at a location in the input image or the input image feature map that corresponds to (x', y') in the output image feature map. For example, the convolution layer can calculate a weighted sum of the pixel values or the feature values in the area having the size of Nx*Ny in the input image or the input image feature map. The feature value at (x', y') in the output image feature map is equal to or based on the weighted sum (e.g., $f(\Sigma_i\Sigma_j w_{i,j}v_{i,j}+b)$ where $v_{i,j}$ is a feature value at (i, j) in a sub-image of the image feature map, $w_{i,j}$ is a weight for the feature value at (i, j), b is a bias, and f( ) is an output function such as sigmoid function or tan h). The same weight sets are applied to every sub-image in the input image feature map.

In embodiments with one or more max pooling layers, the max pooling layer(s) can output, for each feature (x', y') in the output image feature map, the maximum pixel or feature value in the sub-image or the area having a size of Nx*Ny at a location in the input image or the input image feature map that corresponds to (x', y') in the output image feature map. The max pooling layer reduces the size of the output image feature map from the size of the input image or the input image feature map.

First neural network section 120 may include a plurality of convolution layers and max pooling layers. In the embodiment depicted in FIG. 1, first neural network section 120 includes, from upstream to downstream, convolution layer 1 (conv1), max pooling layer 1 (pool1), convolution layer 2 (conv2), max pooling layer 2 (pool2), convolution layer 3 (conv3), max pooling layer 3 (pool3), convolution layer 4 (conv4), and max pooling layer 4 (pool4).

Masking section 130 masks the image feature map from first neural network section 120 by using the mask image from mask generator 110. Masking section 130 outputs a masked image feature map that includes feature values equal to or similar to the feature values in the target area of the image feature map from first neural network section 120, and feature values equal to 0 (or otherwise reduced) in the irrelevant areas of the image feature map.

Second neural network section 140 inputs the masked image feature map and classifies the input image. Second neural network section 140 is a second neural network including at least one classification layer. Each classification layer of the at least one classification layer may be a full-connection layer. In this embodiment, second neural network section 140 includes two full connection layers fc1 and fc2. Fc1 has a connection having a trainable weight to every feature of the masked image feature map. Fc2 has a connection having a trainable weight to every neuron in fc1.

Second neural network section 140 outputs a classification or an identification of the input image. At least one neuron of the last layer in second neural network section 140 outputs a probability or a certainty of the presence or the absence of a predetermined object in the input image. For example, second neural network section 140 may output a probability or a certainty of the presence or the absence of a predetermined disease of an organ in the X-ray image of the organ. In such an embodiment, second neural network section 140 can output a probability or certainty of the presence of pneumonia or a nodule.

In this disclosure, first neural network section 120 and second neural network section 140 are explained as different neural networks sequentially connected by masking section 130. However, first neural network section 120, masking section 130, and second neural network section 140 can be construed as one neural network including image feature extracting layers of first neural network section 120, masking layer of masking section 130, and classification layers of second neural network section 140.

In some embodiments, apparatus 100 further includes saliency map generator 150. Saliency map generator 150 generates a saliency map that shows an area of the input image that affected the classification of the input image. In some embodiments, saliency map generator 150 generates a saliency map based on the output of second neural network section 140 and the result of a back-propagation obtained from conv4 in first neural network section 120. In some embodiments, the saliency map shows the degree of affection of each area in the input image by changing at least one of brightness or colors based on the degree of affection.

In some embodiments, apparatus 100 can mask out the irrelevant area in the input image by applying the mask image to the image feature map from first neural network section 120, and classify the input image within the target area extracted from mask generator 110. If apparatus 100 masks the input image based on the mask image and then sends the masked input image to first neural network section 120, first neural network section 120 may output the image feature map having incorrect feature values near the borders of the target area. To minimize this problem, apparatus 100 can apply the mask image to the image feature map output from the last image feature extracting layer in the layers of first neural network section 120, masking section 130, and second neural network section 140. In some embodiments, masking section 130 can be placed after at least one image feature extracting layer to reduce this problem.

In some embodiments, apparatus 100 can generate a saliency map based on the masked image feature map from masking section 130. Therefore, the saliency map can show an area within or mostly within the target area in the image that is affected the classification.

Figure 2:
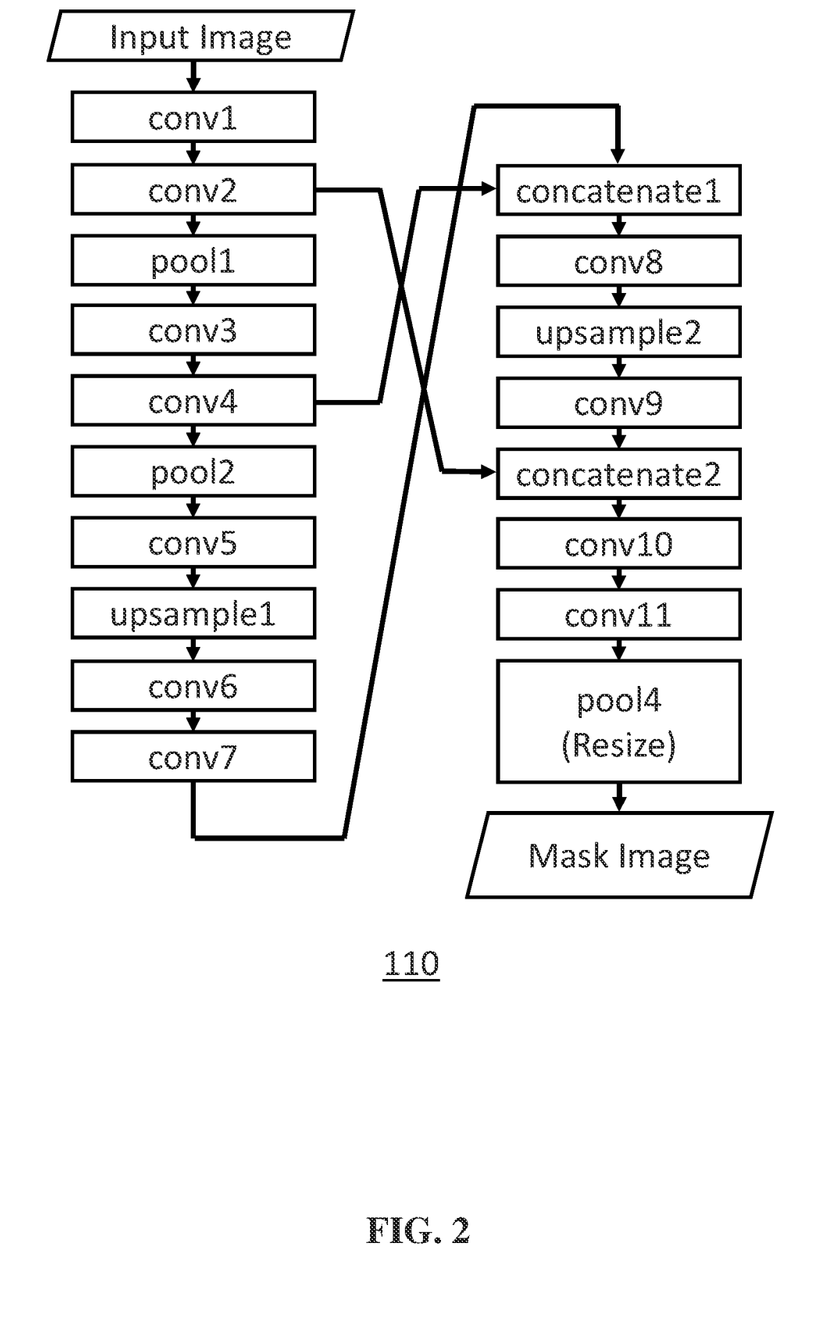
FIG. 2 shows an example of a mask generator according to some embodiments of the present disclosure.

FIG. 2 shows an example of a mask generator 110 according to some embodiments of the present disclosure. In this example, mask generator 110 is a third neural network that generates the mask image. Mask generator 110 of this figure includes a plurality of image feature extracting layers including at least one of a convolution layer or a max pooling layer. Mask generator 110, as depicted, includes, from upstream to downstream, convolution layer 1 (conv1), convolution layer 2 (conv2), max pooling layer 1 (pool1), convolution layer 3 (conv3), convolution layer 4 (conv4), max pooling layer 2 (pool2), convolution layer 5 (conv5), up-sampling layer 1 (upsample1), convolution layer 6 (conv6), convolution layer 7 (conv7), concatenate layer 1 (concatenate1), convolution layer 8 (conv8), up-sampling layer 2 (upsample2), convolution layer 9 (conv9), concatenate layer 2 (concatenate2), convolution layer 10 (conv10), convolution layer 11 (conv11), and max pooling layer 4 (pool4).

Up-sampling layer 1 and up-sampling layer 2 conduct an up-sampling to the image feature map from the previous layer and output the up-sampled image feature map to the next layer. By up-sampling, the size ($SIZE_x$ and/or $SIZE_y$) of the image feature map is increased.

Concatenate layer 1 concatenates the image feature map from convolution layer 4 and the image feature map from convolution layer 7. More specifically, concatenate layer 1 outputs the image feature map from convolution layer 4 together with the image feature map from convolution layer 7 to convolution layer 8. Therefore, convolution layer 8 can generate the image feature map for the next layer based on both image feature maps. Similarly, concatenate layer 2 concatenates the image feature map from convolution layer 2 and the image feature map from convolution layer 9.

Max pooling layer 4 resizes the size of the image feature map from convolution layer 11 to adjust the size of the image feature map from convolution layer 11 to the size of the image feature map output from first neural network section 120. The resized image feature map is used as a mask image.

FIG. 2 depicts an example embodiment of mask generator 110 with the numbers, types, and connections of various layers as shown. Many embodiments can exist using different numbers, types, and connections of layers can exist and be used in accordance with the principles described in this disclosure.

Figure 3:
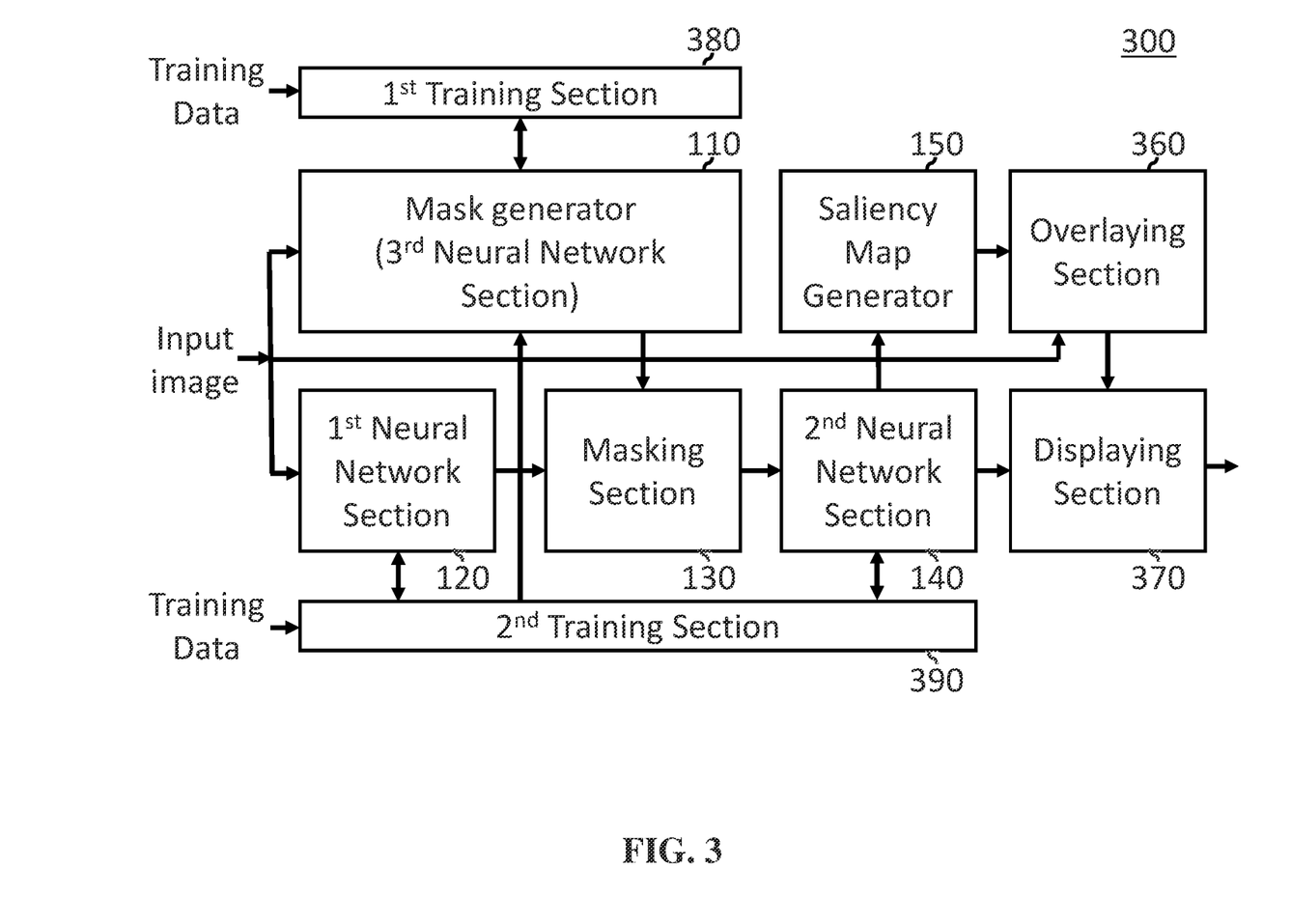
FIG. 3 shows an apparatus according to some embodiments of the present disclosure.

FIG. 3 shows an apparatus 300 according to some embodiments of the present disclosure. Apparatus 300 includes mask generator 110 (or third neural network section), first neural network section 120, masking section 130, second neural network section 140, and saliency map generator 150 of apparatus 100. Mask generator 110, first neural network section 120, masking section 130, and second neural network section 140 are the same or similar to the corresponding components having the same reference numbers in FIG. 1, as discussed above. In some embodiments, apparatus 300 further includes overlaying section 360 and displaying section 370.

Overlaying section 360 receives the saliency map from saliency map generator 150 and the input image, and overlays the saliency map on the input image to obtain a display image. Displaying section 370 outputs the display image and the output from second neural network section 140 to a display device to show the input image, saliency map, and the result of classification.

In FIG. 3, apparatus 300 further includes first training section 380 and second training section 390. First training section 380 receives training data including one or more sets of a training input image and a training mask image, and trains mask generator 110 (the third neural network section) based on the one or more sets of the training input image and the training mask image. For example, the training input image can be an X-ray image of a chest, and the training mask image for this training input image can be prepared by a doctor or medical staff by marking (such as encircling) the lung areas in the input image such that first training section 380 can train the mask generator 110 to construct masks of lung areas. In other implementations, the training mask image can be calculated by using any other image processing software instead of using input from a doctor or medical staff.

Second training section 390 receives a training input image and a training classification and trains the first neural network and the second neural network. In more detail, second training section 390 sends the training input image to mask generator 110 and mask generator 110 generates a training mask image that extracts a target area from the training input image. Mask generator 110 sends the training mask image to masking section 130. Second training section 390 trains the first neural network (first neural network section 120) and the second neural network (second neural network section 140) based on the training input image, the training classification, and the training mask image.

Figure 4:
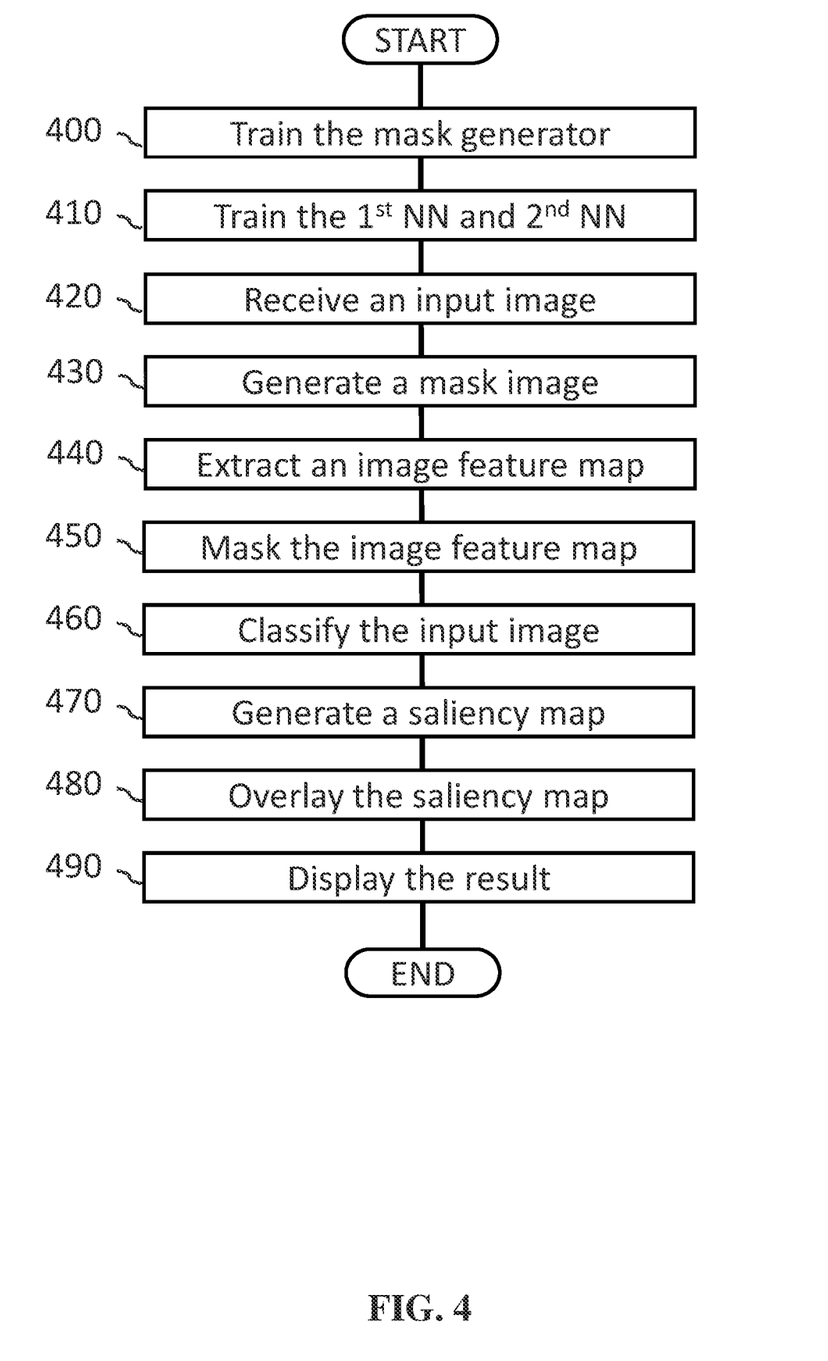
FIG. 4 shows an operational flow according to some embodiments of the present disclosure.

FIG. 4 shows an operational flow according to some embodiments of the present disclosure. The operations of this figure can be performed by, for example, apparatus 100 or apparatus 300 and the components that were explained in reference to FIG. 1 through 3. While the operational flow of this figure will be explained in reference to apparatus 300 and its components, the operational flow can be performed by other apparatus having different components as well.

At 400 (400), first training section 380 trains mask generator 110 as will be explained in more detail in reference to FIG. 5. First training section 380 may initialize the trainable parameters (e.g., weights and biases) in mask generator 110 based on random values or using other sources of initial values. At 410, second training section 390 trains first neural network (NN) section 120 and second neural network (NN) section 140 as will be explained in more detail in reference to FIG. 6. Second training section 390 may initialize the trainable parameters (e.g., weights and biases) in first neural network section 120 and second neural network section 140 based on random values or using other sources of initial values.

At 420, apparatus 300 receives an input image of interest. At 430, mask generator 110 generates a mask image that extracts a target area from the input image of interest. Mask generator 110 receives the input image of interest and propagates and converts the input image of interest through the layers (e.g., conv1, conv2, pool1, conv11, and pool4 in FIG. 2) to obtain the mask image. Mask generator 110, which has been trained in 400, outputs the mask image suitable for extracting a target area (e.g., target organ, such as a lung) from the input image of interest.

At 440, first neural network section 120 extracts an image feature map of the input image of interest, and outputs an image feature map of the input image of interest. First neural network section 120 receives the input image of interest and propagates and converts the input image of interest through the layers (e.g., conv1, pool1, . . . , and pool4 in FIG. 1) to obtain the image feature map output from the last layer in first neural network section 120 (i.e., pool4 in FIG. 1). In some embodiments, first neural network section 120 extracts two or more image feature maps, each of which are assigned to different potential features. More specifically, each layer (conv1 to pool4) in FIG. 1 may have a plurality of layers, each of which are for calculating an image feature map for a different potential feature type at the same stage. If each convolution layer at the same stage is initialized based on random values, then each convolution layer is gradually trained to output an image feature map different from that of a different convolution layer at the same stage (e.g., a first convolution layer is trained to react to a particular shape A, and a second convolution layer at the same stage is trained to react to a different shape B). In this disclosure, each layer at the same stage or each feature type is named "a channel."

At 450, masking section 130 masks the image feature map from first neural network section 120 by using the mask image from mask generator 110 generated at 430. If first neural network section 120 outputs two or more image feature maps for different channels, then masking section 130 masks each of the two or more image feature maps by using the same mask image. In some embodiments, masking section 130 multiplies each feature value in the image feature map and corresponding mask value in the mask image to obtain the masked feature value. In other embodiments, masking section 130 sets 0 to each feature value if the corresponding mask value equals to 0 or the corresponding mask value is less than a threshold.

At 460, second neural network section 140 inputs the masked image feature map and classifies the input image of interest. Second neural network section 140 receives the masked image feature map from masking section 130 and propagates and converts the masked image feature map through the layers (e.g., fc1 and fc2 in FIG. 1) to obtain the classification output from the last layer in second neural network section 140. If masking section 130 outputs two or more image feature maps for different channels, then second neural network section 140 classifies the input image of interest based on these two or more image feature maps.

At 470, saliency map generator 150 generates a saliency map as will be explained in reference to FIG. 7. At 480, overlaying section 360 overlays the saliency map from saliency map generator 150 on the input image of interest to obtain a display image. In some embodiments, overlaying section 360 draws the saliency map as a transparent or semi-transparent image over the input image of interest. In other embodiments, overlaying section 360 overlays the saliency map on the input image of interest by overlaying a contour or outline of the saliency map on the input image of interest. By this function, overlaying section 360 can enclose the potential target object (e.g., a nodule) in the input image of interest. At 490, displaying section 370 outputs the display image and the classification of the input image of interest to a display device and controls the display device to display them to a user of apparatus 300.

In some embodiments, apparatus 300 can make sure that the target object is detected only in the target area by masking the image feature map from first neural network section 120 by using the mask image from mask generator 110. By generating the saliency map based on the masked image feature map, apparatus 300 can indicate the area in the input image of interest where the target object is located and therefore the classification is affected.

Figure 5:
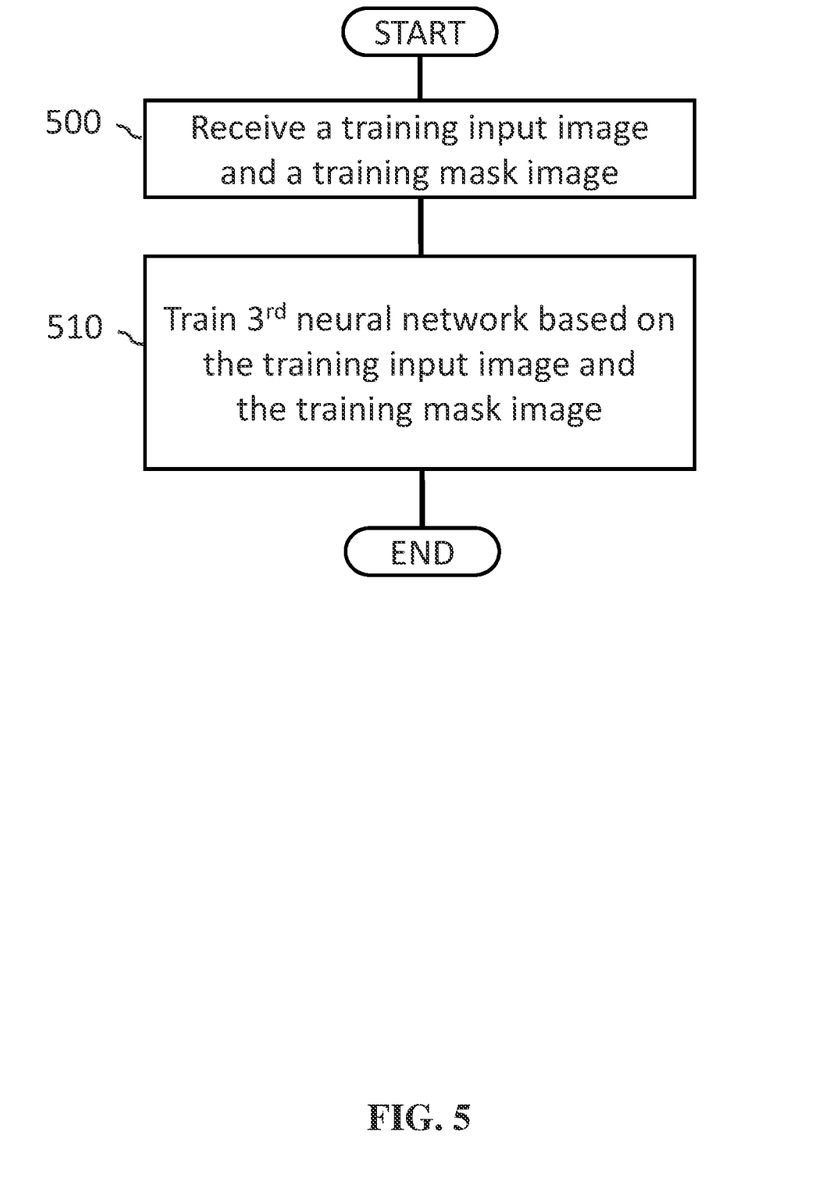
FIG. 5 shows an operational flow for training a mask generator according to some embodiments of the present disclosure.

FIG. 5 shows an operational flow for training a mask generator according to some embodiments of the present disclosure. The operational flow of this figure is a detailed example of 400 in FIG. 4. The operations of this figure can be performed by, for example, apparatus 100 or apparatus 300 and the components that were explained in reference to FIG. 1 through 3. While the operational flow of this figure will be explained in reference to apparatus 300 and its components, the operational flow can be performed by other apparatus having different components as well.

At 500, first training section 380 receives training data including one or more sets of a training input image and a training mask image. At 510, first training section 380 trains saliency map generator 150 (the third neural network) based on the one or more sets of the training input image and the training mask image. For example, for each set of the training input image and the training mask image, first training section 380 trains the third neural network shown in FIG. 2. In this training, first training section 380 updates trainable parameters of mask generator 110 including weights, each of which can be assigned between a neuron in a layer and a neuron in the next layer, and biases of neurons. First training section 380 updates the trainable parameters to decrease or minimize the difference between the training mask image and a mask image generated by mask generator 110 based on the training input image.

This training can be done by back-propagating the difference (or error) between the training mask image and the generated mask image from the last layer to the first layer in mask generator 110 and updating the trainable parameters in each layer to decrease the difference at each layer. In some embodiments, first training section 380 uses each set of the training image and the training mask image two or more times to repeat updating the trainable parameters of mask generator 110 and minimize the differences. In some embodiments, this can occur until a threshold value is reached.

Figure 6:
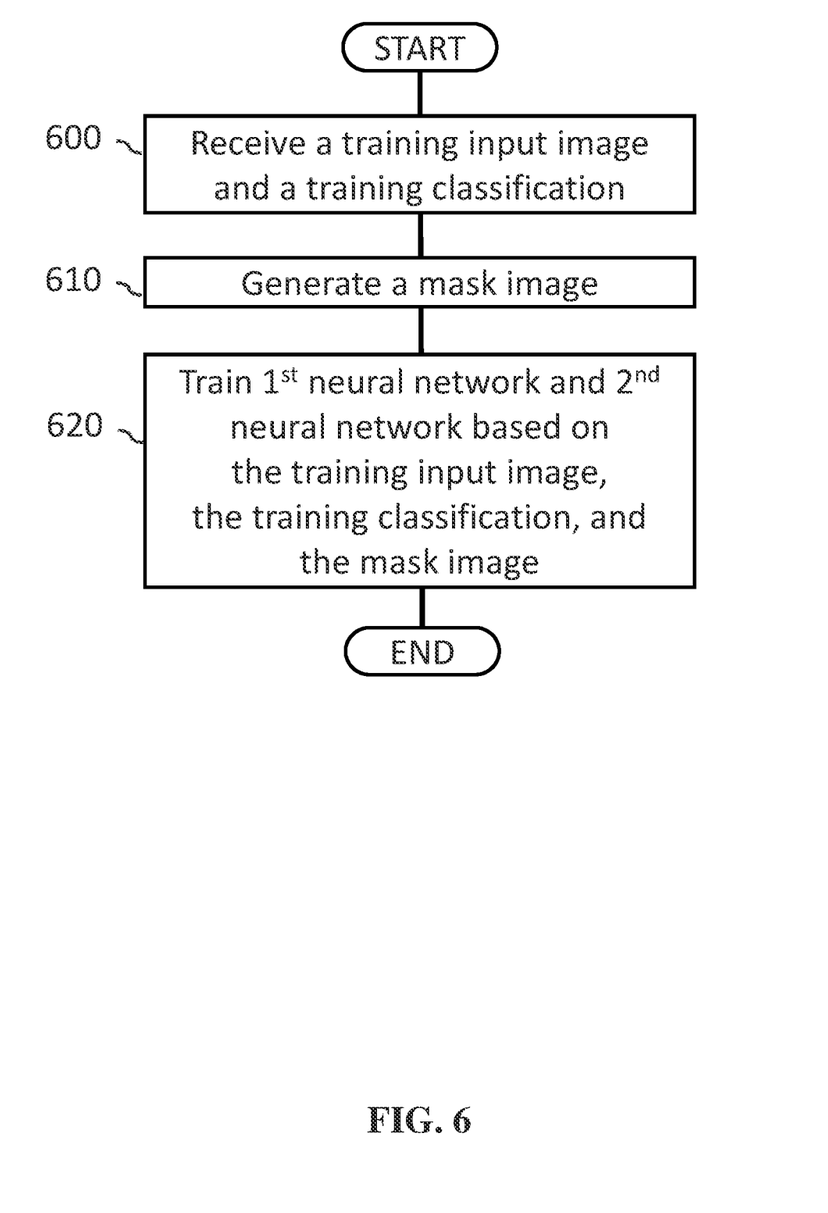
FIG. 6 shows an operational flow for training a first and second neural network sections according to some embodiments of the present disclosure.

FIG. 6 shows an operational flow for training first and second neural network sections according to some embodiments of the present disclosure. The operational flow of this figure is a detailed example of 410 in FIG. 4. The operations of this figure can be performed by, for example, apparatus 100 or apparatus 300 and the components that were explained in reference to FIG. 1 through 3. While the operational flow of this figure will be explained in reference to apparatus 300 and its components, the operational flow can be performed by other apparatus having different components as well.

At 600, second training section 390 receives training data including one or more sets of a training input image and a training classification. At 610, second training section 390 sends each training input image to mask generator 110. Mask generator 110 generates a training mask image that extracts a target area from each training input image. Mask generator 110 sends the training mask image to masking section 130.

At 620, second training section 390 trains first neural network section 120 and second neural network section 140 based on the training input image, the training classification, and the training mask image. For example, for each set of the training input image, the training mask image from mask generator 110, and the training classification, second training section 390 trains first neural network section 120 and second neural network section 140 (or a neural network including first neural network section 120, masking section 130, and second neural network section 140). In this training, second training section 390 updates trainable parameters of the first neural network section 120 and second neural network section 140 including weights each of which can be assigned between a neuron in a layer and a neuron in the next layer, and biases of neurons. Second training section 390 updates the trainable parameters to decrease or minimize the difference between the training classification and a classification generated by first neural network section 120, masking section 130, and second neural network section 140 based on the training input image and the training mask image.

This training can be done by back-propagating the difference (or error) between the training classification and the generated classification from the last layer to the first layer in first neural network section 120, masking section 130, and second neural network section 140, and updating the trainable parameters in each layer to decrease the difference at each layer. When back-propagating the difference from second neural network section 140 to first neural network section 120, masking section 130 masks the difference (array of difference values) by using the training mask image. Therefore, masking section 130 propagates the difference values within the target area to first neural network section 120, but masking section 130 does not propagate the difference values (or propagate reduced difference values) in irrelevant areas. In this way, second training section 390 can train first neural network section 120 based on the difference values within the target area, and second training section 390 can reduce the influence of the difference values in the irrelevant areas on training first neural network section 120.

Figure 7:
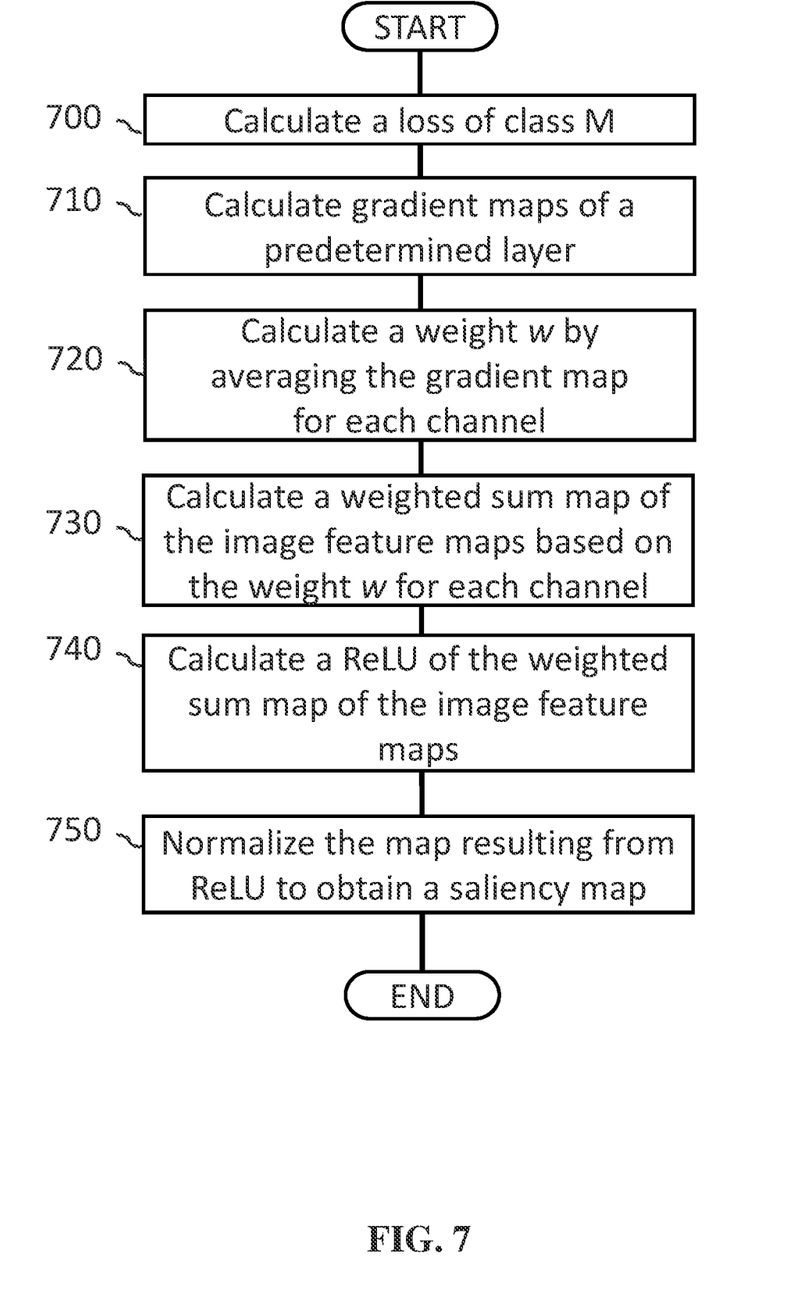
FIG. 7 shows an operational flow for generating a saliency map according to some embodiments of the present disclosure.

FIG. 7 shows an operational flow for generating a saliency map according to some embodiments of the present disclosure. The operational flow of this figure is a detailed example of 470 in FIG. 4. The operations of this figure can be performed by, for example, apparatus 100 or apparatus 300 and the components that were explained in reference to FIG. 1 through 3. While the operational flow of this figure will be explained in reference to apparatus 300 and its components, the operational flow can be performed by other apparatus having different components as well.

At 700, saliency map generator 150 receives the output of second neural network section 140. The output of second neural network section 140 is a classification of the input image. In one embodiment, the classification includes one or more probabilities each of which is a probability that the input image falls into a certain class. For example, the classification includes a first probability that the input image contains a nodule image in the lung area, and a second probability that the input image contains pneumonia image.

In this embodiment, saliency map generator 150 calculates a loss of a predetermined class (e.g., class M in this figure). For example, if saliency map generator 150 is generating a saliency map relating to the presence of a nodule, saliency map generator 150 calculates a loss of a class relating to the presence of a nodule. Saliency map generator 150 can calculate the loss based on the probability of the predetermined class from second neural network section 140 and a probability of 1.0 (or 100%). Saliency map generator 150 can use a predetermined loss function such as squared error to calculate the loss. For example, if the probability of the presence of a nodule is 93%, the loss is calculated to be $(100\%-93\%)^2$. In other implementations, saliency map generator 150 can use a different loss function or can use the difference between the probability of 100% and the probability from second neural network section 140.

At 710, saliency map generator 150 calculates a gradient map for each channel of a predetermined layer. In more detail, second neural network section 140 executes a back-propagation to propagate the difference between the probability of 1.0 and the probability from second neural network section 140. In some embodiments, second neural network section 140 outputs an array of the differences (x, y) to masking section 130, and masking section 130 masks the array of the differences (x, y) based on the mask image from mask generator 110. In one implementation, first neural network section 120 can further execute a back-propagation to propagate the differences from the last layer of first neural network section 120 to a predetermined layer (e.g., conv4 in FIG. 1).

By this back-propagation, saliency map generator 150 can obtain differences of features at each location (x, y) in the predetermined layer (an image feature extracting layer) corresponding to the difference between the probability of the predetermined class and a probability of 1.0. Saliency map generator 150 calculates a loss at each location (x, y) in the predetermined layer by using the same loss function. The ratio of the loss at the output of second neural network section 140 and the loss of feature at (x, y) at the predetermined layer is a "gradient" at (x, y) at the predetermined layer. An array of the gradient at (x, y) can be referred to as "a gradient map." Each gradient represents the degree of importance of feature value at (x, y) in the image feature map for determining the probability of the predetermined class. In cases where the predetermined layer has two or more channels, saliency map generator 150 calculates a gradient map for each channel.

At 720, saliency map generator 150 calculates a weight w for each gradient map in the predetermined layer. In some embodiments, saliency map generator 150 can calculate the weight w as an average of the gradients in the gradient map. In some embodiments, the weight w can be calculated as a sum instead. The weight w represents a degree of importance of each gradient map or each channel for determining the probability of the predetermined class.

At 730, saliency map generator 150 calculates a weighted sum map of the image feature maps in the predetermined layer based on the weight w for each channel. By this calculation, saliency map generator 150 merges features (x, y) of channels based on the importance of each channel and obtains a scalar value that reflects the degree of influence to the probability of the predetermined class.

At 740, saliency map generator 150 calculates a ReLU (Rectified Linear Unit) of the weighted sum map. ReLU(X) is equal to X if X>0 and 0 if X<0. By calculating the ReLU of the weighted sum map, negative values in the weighted sum map are changed to 0. Therefore, scalar values in the weighted sum map positively influenced for determining the probability of the predetermined class are maintained while scalar values in the weighted sum map that negatively influenced the determination are set to 0.

At 750, saliency map generator 150 normalizes the map resulting from ReLU at 740 to obtain the saliency map. In this way, saliency map generator 150 can generate a saliency map that has higher values in an area of the input image that is affected the classification of the predetermined class and has lower values in an area of the input image that is not affected the classification of the predetermined class.

In some embodiments, saliency map generator 150 adds colors to the saliency map. For example, saliency map generator 150 assigns red to higher values in the saliency map, yellow to the middle values in the saliency map, green to lower values in the saliency map, and colorless and/or transparent to near 0 values in the saliency map.

Figure 8:
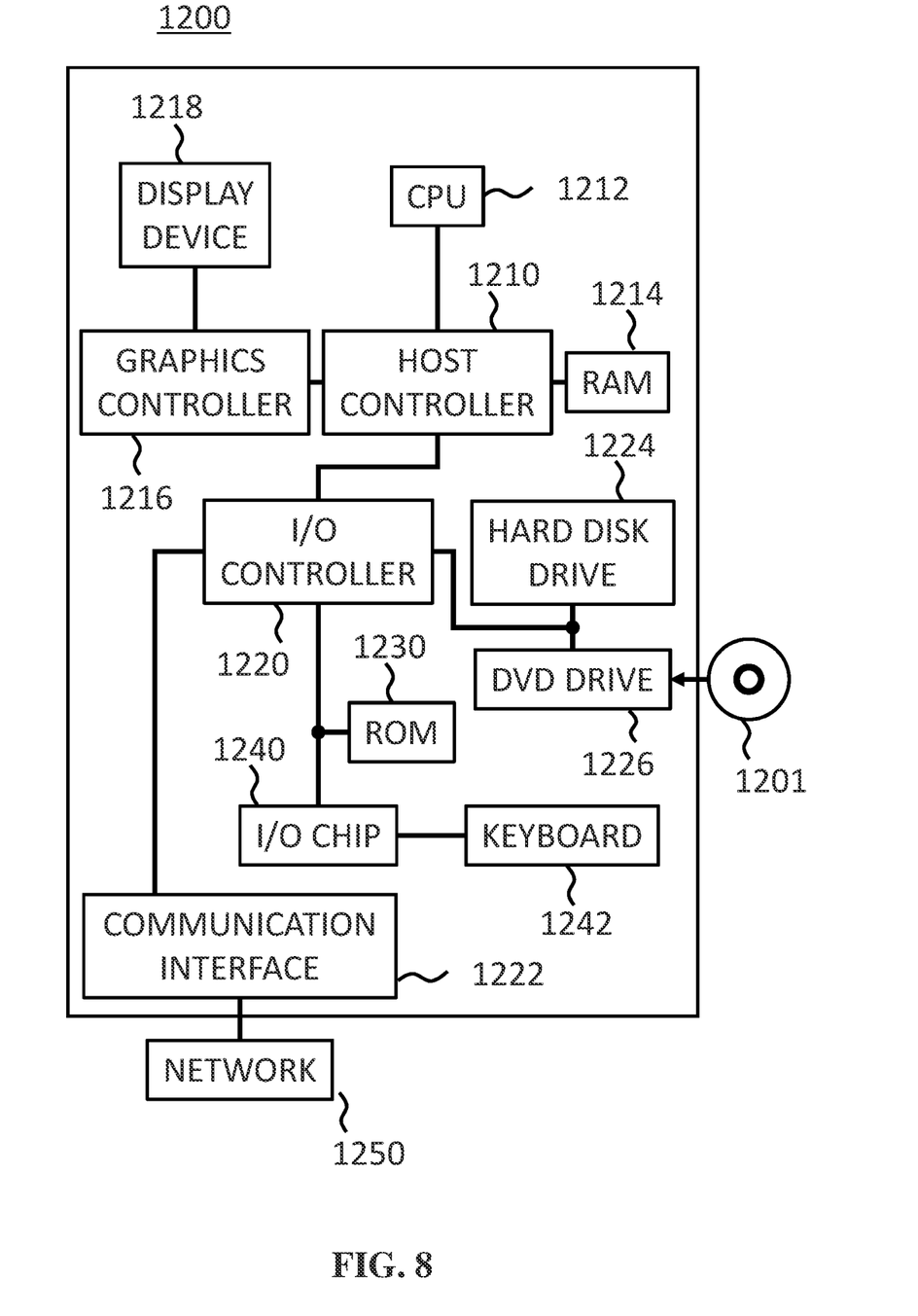
FIG. 8 shows an example hardware configuration of a computer according to some embodiments of the present disclosure.

FIG. 8 shows an example hardware configuration of a computer 1200 in which aspects of the present disclosure may be wholly or partly embodied. A program that is installed in the computer 1200 can cause the computer 1200 to function as or perform operations associated with apparatuses of the embodiments of the present disclosure (including apparatus 100 and apparatus 300) or one or more sections thereof, and/or cause the computer 1200 to perform processes of the embodiments of the present disclosure or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, and a DVD-ROM drive 1226, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself and causes the image data to be displayed on the display device 1218.

The communication interface 1222 communicates with other electronic devices via a network 1250. The hard disk drive 1224 stores programs and data used by the CPU 1212 within the computer 1200. The DVD-ROM drive 1226 reads the programs or the data from the DVD-ROM 1201 and provides the hard disk drive 1224 with the programs or the data via the RAM 1214.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program can be provided by computer readable media such as the DVD-ROM 1201. The program can be read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, or the DVD-ROM 1201, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network 1250.

While the embodiments of the present disclosure have been described, the technical scope of the disclosure is not limited to the above described embodiments. It will be apparent to persons skilled in the art that various alterations and improvements can be added to the above-described embodiments. It should also apparent from the scope of the claims that the embodiments added with such alterations or improvements are within the technical scope of the disclosure.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for image classification comprising:
   extracting an image feature map of an input image;
   masking the image feature map using a mask image; and
   classifying the input image by inputting the masked image feature map into a neural network.

2. The computer-implemented method of claim 1, wherein the neural network includes at least one classification layer, and wherein extracting the image feature map comprises:
   inputting the input image into a second neural network that includes at least one image feature extracting layer.

3. The computer-implemented method of claim 2, wherein the at least one image feature extracting layer includes at least one of a convolution layer or a max pooling layer.

4. The computer-implemented method of claim 2, wherein each classification layer of the at least one classification layer is a full-connection layer.

5. The computer-implemented method of claim 2, wherein the mask image is generated using a third neural network.

6. The computer-implemented method of claim 5, wherein the third neural network includes at least one of a convolution layer or a max pooling layer.

7. The computer-implemented method of claim 5, further comprising:
   receiving a training input image and a training mask image; and
   training the third neural network based on the training input image and the training mask image.

8. The computer-implemented method of claim 2, wherein the extracting includes extracting two or more image feature maps, and wherein the masking includes masking each of the two or more image feature maps by using the mask image.

9. The computer-implemented method of claim 2, further comprising:
   receiving a training input image and a training classification;
   generating a training mask image that extracts a target area from the training input image; and
   training the neural network and the second neural network based on the training input image, the training classification, and the training mask image.

10. The computer-implemented method of claim 2, further comprising generating a saliency map that shows an area of the input image that affected the classification of the input image.

11. The computer-implemented method of claim 10, further comprising overlaying the saliency map on the input image to obtain a display image.

12. The computer-implemented method of claim 11, wherein the overlaying includes overlaying a contour of the saliency map on the input image to obtain the display image.

13. The computer-implemented method of claim 2, wherein the input image is an X-ray image of an organ, and the generating the mask image includes extracting an image area corresponding to the organ from the X-ray image.

14. A computer program product for image classification, the computer program product comprising a computer readable storage medium having program instructions embodied therewith, the program instructions executable by a processor to cause the processor to perform operations comprising:
   extracting an image feature map of an input image;
   masking the image feature map using a mask image; and
   classifying the input image by inputting the masked image feature map into a neural network.

15. The computer program product of claim 14, wherein the neural network includes at least one classification layer, and wherein extracting the image feature map comprises:
   inputting the input image into a second neural network that includes at least one image feature extracting layer.

16. The computer program product of claim 15, wherein the mask image is generated using a third neural network.

17. The computer program product of claim 14, the operations further comprising generating a saliency map that shows an area of the input image that affected the classification of the input image.

18. The computer program product of claim 14, wherein the input image is an X-ray image of an organ, and the generating the mask image includes extracting an image area corresponding to the organ from the X-ray image.

19. An apparatus for image classification comprising:
one or more processors; and
a memory communicatively coupled to the one or more processors, wherein the memory comprises instructions that, when executed by the one or more processors, cause the one or more processors to perform a method comprising:
extracting an image feature map of an input image;
masking the image feature map using a mask image; and
classifying the input image by inputting the masked image feature map into a neural network.

20. The apparatus of claim 19, wherein the neural network includes at least one classification layer, and wherein extracting the image feature map comprises:
inputting the input image into a second neural network that includes at least one image feature extracting layer.

21. The apparatus of claim 19, wherein the mask image is generated using a third neural network, and wherein the method further comprises:
receiving a training input image and a training mask image; and
training the third neural network based on the training input image and the training mask image.

* * * * *